(12) United States Patent
Crotser et al.

(10) Patent No.: US 12,320,907 B2
(45) Date of Patent: Jun. 3, 2025

(54) SYSTEMS AND METHODS FOR DYNAMIC CHARACTERIZATION AND ADJUSTMENT OF RADIO FREQUENCY APERTURE AND TRANSMISSION

(71) Applicant: Redwire Holdings, LLC, Jacksonville, FL (US)

(72) Inventors: Dave Crotser, Longmont, CO (US); Heather Passe, Boulder, CO (US); Lee Peterson, Placitas, NM (US)

(73) Assignee: REDWIRE HOLDINGS, LLC, Jacksonville, FL (US)

( * ) Notice: Subject to any disclaimer, the term of this patent is extended or adjusted under 35 U.S.C. 154(b) by 399 days.

(21) Appl. No.: 17/981,416

(22) Filed: Nov. 5, 2022

(65) Prior Publication Data
US 2023/0350082 A1 Nov. 2, 2023

Related U.S. Application Data

(60) Provisional application No. 63/276,118, filed on Nov. 5, 2021.

(51) Int. Cl.
*G01S 19/48* (2010.01)
*G01S 5/14* (2006.01)

(52) U.S. Cl.
CPC .............. *G01S 19/485* (2020.05); *G01S 5/14* (2013.01)

(58) Field of Classification Search
CPC ................ G01S 19/485; G01S 5/14
USPC ..................................................... 342/357.28
See application file for complete search history.

(56) References Cited

U.S. PATENT DOCUMENTS 10,225,016 B1 * 3/2019 Khaleghi ............ H04J 14/0256
12,188,762 B1 * 1/2025 Tongue ............... G01B 11/2441

FOREIGN PATENT DOCUMENTS

CN 108490388 B * 6/2021 ........... G01S 5/0257

* cited by examiner

*Primary Examiner* — Harry K Liu
(74) *Attorney, Agent, or Firm* — Terry M. Sanks, Esquire; Beusse Sanks, PLLC

(57) ABSTRACT

The present disclosure provides for systems and methods for quasi-static and dynamic characterization and adjustment of radio frequency aperture and transmission. The system may comprise a transmission structure with a plurality of sensors and a plurality of optical metric markers. The system may send information from an estimator to one or more controllers via corrective signals. The method may comprise conversion of distance measurements received from a plurality of sensors to plot cartesian coordinates in three-dimensional space as a function of time. The computation module may comprise multilateration or trilateration and the estimator. When the system comprises one or more controllers, the controllers may be actuated in response to optical information received from the plurality of optical metric markers. The estimator may provide knowledge needed for phase correction of large array from sparse data that is then translated to controller actuation.

20 Claims, 17 Drawing Sheets

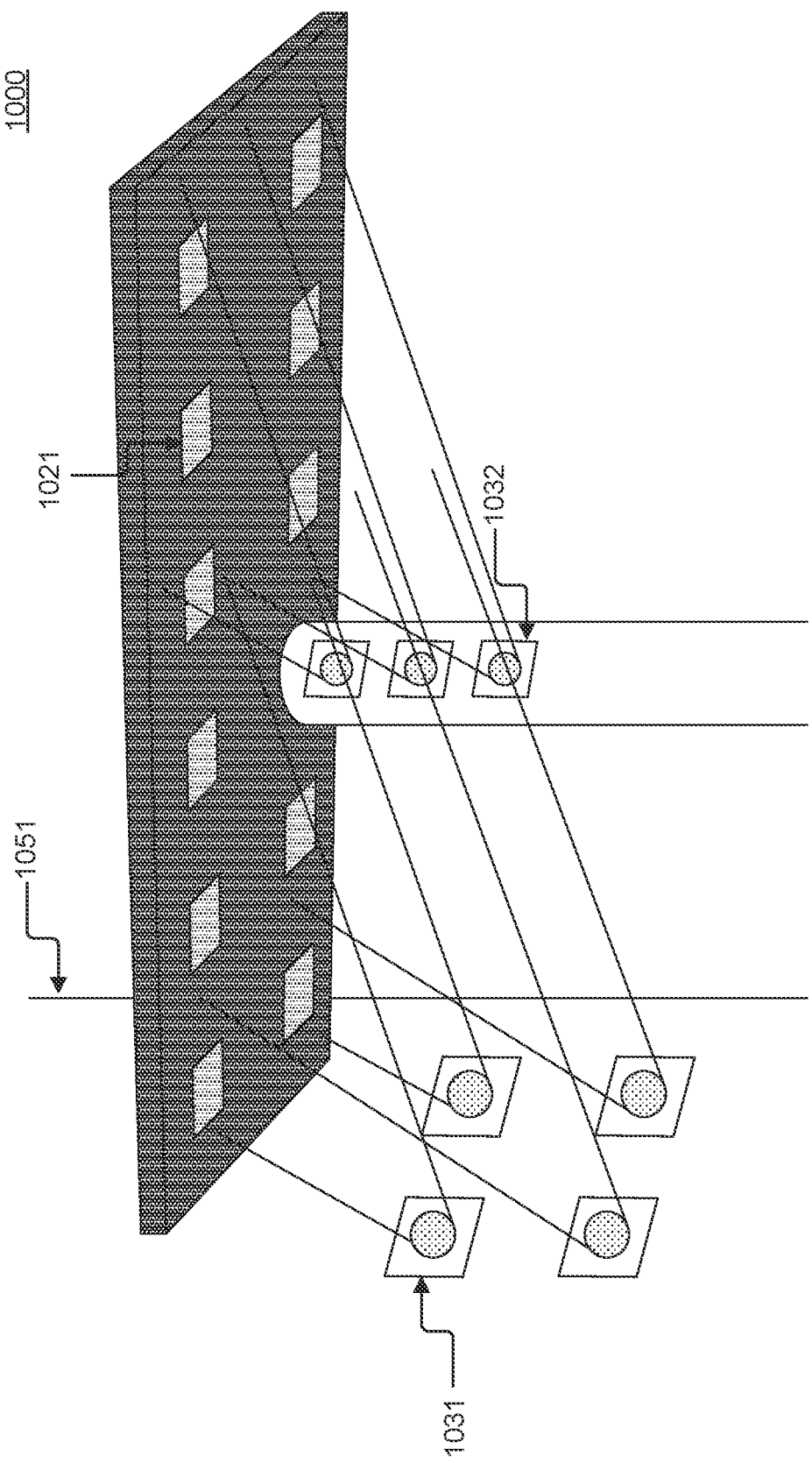

1400

```
┌─────────────────────────────────────┐
│ Receive external data reading exerted│
│ on the transmission structure       │
│                                1405 │
└─────────────────────────────────────┘
                 │
                 ▼
┌─────────────────────────────────────┐
│ Measure distance from sensors to a  │
│ plurality of optical metric markers │
│                                1410 │
└─────────────────────────────────────┘
                 │
                 ▼
┌─────────────────────────────────────┐
│ Calculate three-dimensional positions of│
│ optical metric markers              │
│                                1415 │
└─────────────────────────────────────┘
                 │
                 ▼
┌─────────────────────────────────────┐
│ Characterize the surface attached to the│
│ optical metric markers              │
│                                1420 │
└─────────────────────────────────────┘
                 │
                 ▼
┌─────────────────────────────────────┐
│ Compare current surface orientation to│
│ optimal configuration               │
│                                1425 │
└─────────────────────────────────────┘
                 │
                 ▼
┌─────────────────────────────────────┐
│ Modify surface shape and aperture for│
│ optimal radio frequency transmission│
│                                1430 │
└─────────────────────────────────────┘
                 │
                 ▼
┌─────────────────────────────────────┐
│ Assess current transmission for post-│
│ estimator error                     │
│                                1435 │
└─────────────────────────────────────┘
                 │
                 ▼
┌─────────────────────────────────────┐
│ Revise current estimations and      │
│ implement additional mechanical     │
│ adjustments                    1440 │
└─────────────────────────────────────┘
```

FIG. 14

SYSTEMS AND METHODS FOR DYNAMIC CHARACTERIZATION AND ADJUSTMENT OF RADIO FREQUENCY APERTURE AND TRANSMISSION

CROSS-REFERENCE TO RELATED APPLICATION

This application is a Non-provisional of and claims priority to U.S. Provisional Patent Application Ser. No. 63/276,118 (filed Nov. 5, 2021, and titled "SYSTEMS AND METHODS FOR DYNAMIC CHARACTERIZATION AND ADJUSTMENT OF RADIO FREQUENCY APERTURE AND TRANSMISSION"), the entire contents of which are incorporated herein by reference.

This invention was made with government support under (Contract No. FA9453-20-C-0003) awarded by Air Force Research Laboratory (AFRL). The government has certain rights in the invention.

BACKGROUND

Systems of measurement enable humanity to make sense of the data they collect. Systems of measurement also facilitate the categorization of data. There are several ways to measure temperature, weight, length, volume, force, speed, time, and more. All of these systems require particular instruments that are calibrated to adequately measure the relevant data. Most of these instruments are highly sophisticated; others are constantly being iterated in the hopes of furthering innovation in their relative fields, such as measuring moving objects in space.

Distance, lack of gravity, light distortion, orbits, and other extraterrestrial challenges make measuring celestial bodies, particularly moving ones, and characterizing surfaces incredibly difficult. Current methods revolve primarily around the use of satellite telescopes having optic components. These optic components, typically high-tech cameras, capture a series of images of single targets that are later measured using printed or digitized photographs.

Uncrewed satellites in Earth's orbit perform various functions including collecting data, relaying communications, and providing navigation knowledge and services. Existing and developing orbital technologies are enabled by knowledge of shapes, positions, and/or deflections of structures and objects within the system. For example, large radio frequency (RF) apertures can be electronically phase-corrected if the aperture shape is known; large deployable systems can be characterized if the motions and final position of elements are monitored; on orbit assembly, docking, and rendezvous operations can be enabled by monitoring motions and positions of system elements.

SUMMARY OF THE DISCLOSURE

What is needed are systems and methods for dynamic characterization and adjustment of radio frequency structures through aperture and transmission structure modification. In some embodiments, the systems or methods may comprise an optical metrology system for real-time shape characterization of aperture deformation, where the deformation knowledge may be used for phase correction of an antenna array. This device implements an Optical Frequency Domain Reflectometer (OFDR) free-space range measurement instrument, multilateration for displacement characterization, and numerical estimation for high-fidelity static and dynamic structure characterizations.

The presently described laser range-finding technology can be configured to measure a plurality of optical metric markers. The estimator's algorithms may be able to use this information to calculate size, shape, and even velocity of an object of interest at real-time refresh rates. In some embodiments, the optical metrology system may measure large aperture RF arrays to enable electronic phase correction. In some implementations, the optical metrology system may be easily configurable to serve on-orbit operations such as docking, rendezvous, and other proximal operations.

The present disclosure comprises a form of laser distance measurement using optical interference comparison ideal for high-resolution strain measurements. This technology, when not coupled to a fiber optic, may be used for long-distance, high-accuracy, free-space range measurements, ideal for a non-contact metrology system. Traditional laser range finders measure range to one optical metric marker at a time, where OFDR free-space offers the ability to measure ranges and range velocities to multiple optical metric markers simultaneously.

The present disclosure provides for systems and methods for static and dynamic characterization and adjustment of radio frequency aperture and transmission. The system may comprise a transmission structure, a plurality of sensors, and a plurality of optical metric markers. In some embodiments, the RF controller may receive aperture shape data from an estimator. The method may use ranges to determine cartesian coordinates of optical metric markers in three-dimensional space.

Sensor measurements may be processed by a decipherer to correlate the metric measurements to the associated sensors and optical metric markers. Correlated ranges may be used to calculate the cartesian coordinates and motions of all sensors and optical metric markers using multilateration computation methods.

The estimator may use the output of the multilateration to calculate the structural shape or deformation at a higher spatial density than the placement of optical metric markers. In some aspects, the output of the estimator may be used for phase correction of RF arrays.

BRIEF DESCRIPTION OF THE DRAWINGS

The accompanying drawings that are incorporated in and constitute a part of this specification illustrate several embodiments of the disclosure and, together with the description, serve to explain the principles of the disclosure:

FIG. 10B illustrates an exemplary optical metrology system comprising a plurality of sensors, according to some embodiments of the present disclosure.

FIG. 14 illustrates an exemplary method for an optical metrology system, according to some embodiments of the present disclosure.

DETAILED DESCRIPTION

In the following sections, detailed descriptions of examples and methods of the disclosure will be given. The description of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Glossary

Sensor: As used herein refers to a receiver of optical input. In some embodiments, the sensor may comprise a collimator and expander lens. In some implementations, the sensor may transmit the intended signal. In some embodiments, the sensor may receive light that originates from the sensor. In some aspects, the sensor may transmit to, and receive information from, a plurality of optical metric markers simultaneously.

Optical Metric Marker: As used herein refers to a reflective or retro-reflective device attached to an element or location of interest on a structure. In some embodiments, an optical metric marker may return signals from a sensor to make a metric measurement.

Controller: As used herein refers to a mechanism that performs an adjustment in response to input from the optical metrology system. In some embodiments, the controller may comprise a mechanical actuator and a software executable as a non-limiting option. In some implementations, the object acted upon may enact anticipated corrections and adjustments from the optical metrology system. For example, a transmission panel may mechanically actuate via the controller based on feedback from the optical metrology system that may improve the aperture of the transmission in real-time.

Computation module: As used herein refers to a portion of the optical metrology system that interacts with the data collected from the optical metrology system. In some embodiments, the computation module may comprise a decipherer that associates each range or metric received with an associated sensor and optical metric marker. In some implementations, the computation module may comprise a chirplet pre-processor. In some aspects, the computation module may comprise a multilateration module that receives range data and calculates three cartesian coordinates for each optical metric marker and each sensor. In some implementations, the optical metrology system may comprise OFDR instrumentation that outputs an intensity peak at a range on the X-axis with or without metadata about which sensor and optical metric marker the range came from. In some embodiments, the computation module may comprise an estimator that may map cartesian coordinates of optical metric markers to nodes of a finite element model and calculate resulting positions and orientations of RF elements, or other locations of interest.

Figure 1:
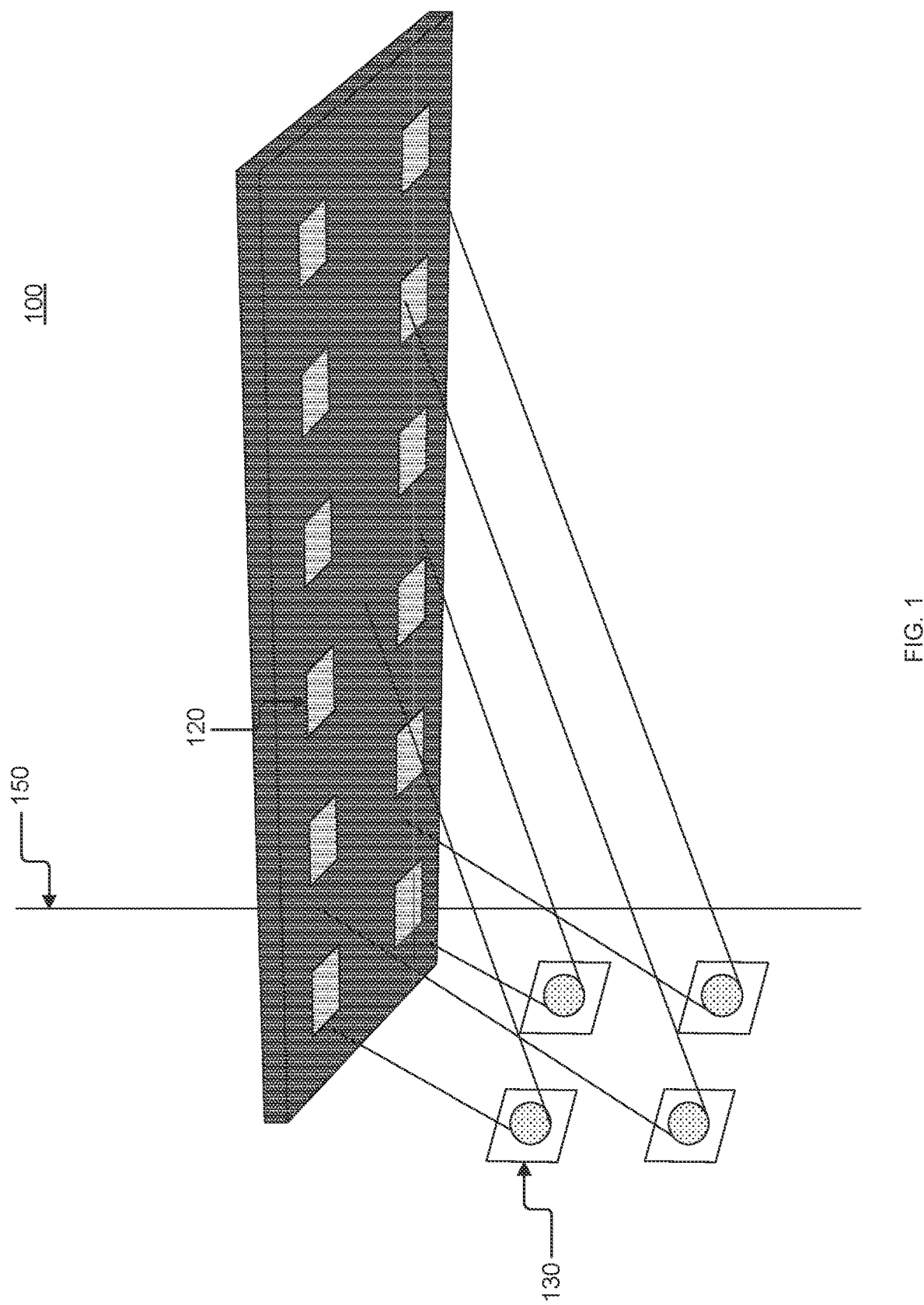
FIG. 1 illustrates an exemplary optical metrology system, according to some embodiments of the present disclosure.

Referring now to FIG. 1, an exemplary optical metrology system 100 is illustrated. In some embodiments, the optical metrology system 100 may comprise a transmission structure 150. In some implementations, the optical metrology system 100 may comprise a plurality of sensors 130. In some aspects, the sensors 130 may send optical signals to a plurality of optical metric markers 120.

In some embodiments, the optical metrology system 100 may comprise a transmission structure 150. In some implementations, the transmission structure 150 may comprise a plurality of surfaces. In some aspects, the optical metrology system 100 may engage sensors 130 to characterize the surfaces of the transmission structure 150. In some aspects, the sensors may measure ranges to a plurality of optical metric markers 120.

As an illustrative example, the sensors 130 may comprise two or more optical sensors that utilize photogrammetry, reflectometry, strain-gauge measurements, or other non-limiting measuring methods to measure direction by determining the location of coded target images in a two-dimensional image plane. Using digital image correlation, the position of each optical metric marker may be calculated based on the relative direction from the camera to the optical metric marker images in a series of simultaneous images from multiple optical sensors at different viewpoints.

In some embodiments, the optical sensors 130 may measure angular position. In some implementations, simultaneous images of multiple optical metric markers 120 may be used to determine the geometrical optical metric markers' 120 location in three-dimensional space using triangulation; utilizing fundamental geometric principles, the angular measurements may be converted to cartesian coordinates.

In some embodiments, the sensors 130 may measure distance or velocity, or both, along a line of sight to at least one reflective optical metric marker 120. In some implementations, multiple sensors may simultaneously measure the distance to a common array of optical metric markers 120.

In some aspects, the estimator may use multilateration or trilateration, as non-limiting methods of calculation, or a combination thereof, to determine fully defined three-dimensional positions of optical metric markers in cartesian space. In some implementations, the optical metrology system 100 may alternate between two or more mathematical methods with a predetermined cadence to optimize the accuracy and refresh rate of the optical metrology system 100. In some embodiments, the estimator may receive the measurements of the optical metric markers from the decipherer, which may form associative connects that associate the receiving sensor and the respective optical metric marker 120.

In some embodiments, the sensors 130 may measure distance or velocity, or both, along a line of sight to at least one reflective optical metric marker 120. In some implementations, two or more sensors 130 may simultaneously measure the distance to a common array of optical metric markers 120. In some embodiments, the decipherer may determine which sensor 130 and which optical metric marker 120 are associated with each linear metric.

In some embodiments, the estimator may enable knowledge of six degrees of freedom of each radio frequency element (or the component of interest for non-radio frequency applications) based on three degrees-of-freedom positional knowledge of optical metric markers. In some implementations, the estimator may be built on prior knowledge of a transmission structure's 150 mechanical properties and mode shapes and modal frequencies. In some aspects, the estimator may assume the structure is engineered with well-predicted behavior.

In some embodiments, temperatures and forces may operate as forcing functions upon the physical structure, which results in a static or dynamically changing shape. In some implementations, the shape of the structure may result in both displacement of optical metric markers and the displacements and rotations of transmitting elements. In some aspects, sensors 130 may measure ranges to the optical metric markers, with some noise, introduced from a plurality of sources. In some implementations, the estimator may receive the measurement ranges and output a matrix of transmission element displacements and rotations.

In some aspects, the estimation error may comprise the absolute value of the difference between the displacements and rotations of the transmission elements and the computed matrix of element displacements. In some embodiments, the estimator may be designed to minimize the estimation error over the range of expected orbital conditions and operations, as non-limiting examples. In some implementations, a radio frequency controller may receive the computed matrix of element displacements and rotations without knowledge of the estimation error.

In some aspects, the radio frequency controller may utilize the computed matrix of element displacements and rotations to command the phase and power of the transmission elements to emulate the desired radio frequency pattern. In some embodiments, the resulting radio frequency pattern may be transmitted. In some implementations, the radio frequency pattern error may comprise the absolute value of the difference between the desired radio frequency pattern and the transmitted radio frequency pattern.

In some embodiments, the optical metrology system 100 may calculate the positional information of the optical metric markers 120 and characterize the surface attached to the optical metric markers 120. In some implementations, the characterization of the surface may allow for active monitoring of the surface for deformation, comparing the surface to the intended shape and orientation for signal transmission, and evaluating intentional orientation adjustments for alignment, as non-limiting examples. In some implementations, the characterization of the surface may allow the optical metrology system 100 to modify the characterized surface.

As an illustrative example, a satellite may comprise transmission panels that pivot on a rotational axis. The transmission panels may comprise optical metric markers 120 that allow the satellite to know the precise orientation of the transmission panels via embedded sensors 130. When improving the signal of the radio frequency transmission, the satellite may use information received from the computation module to actuate the rotational axis of the transmission panels for improved radio frequency transmission.

Figure 2A:
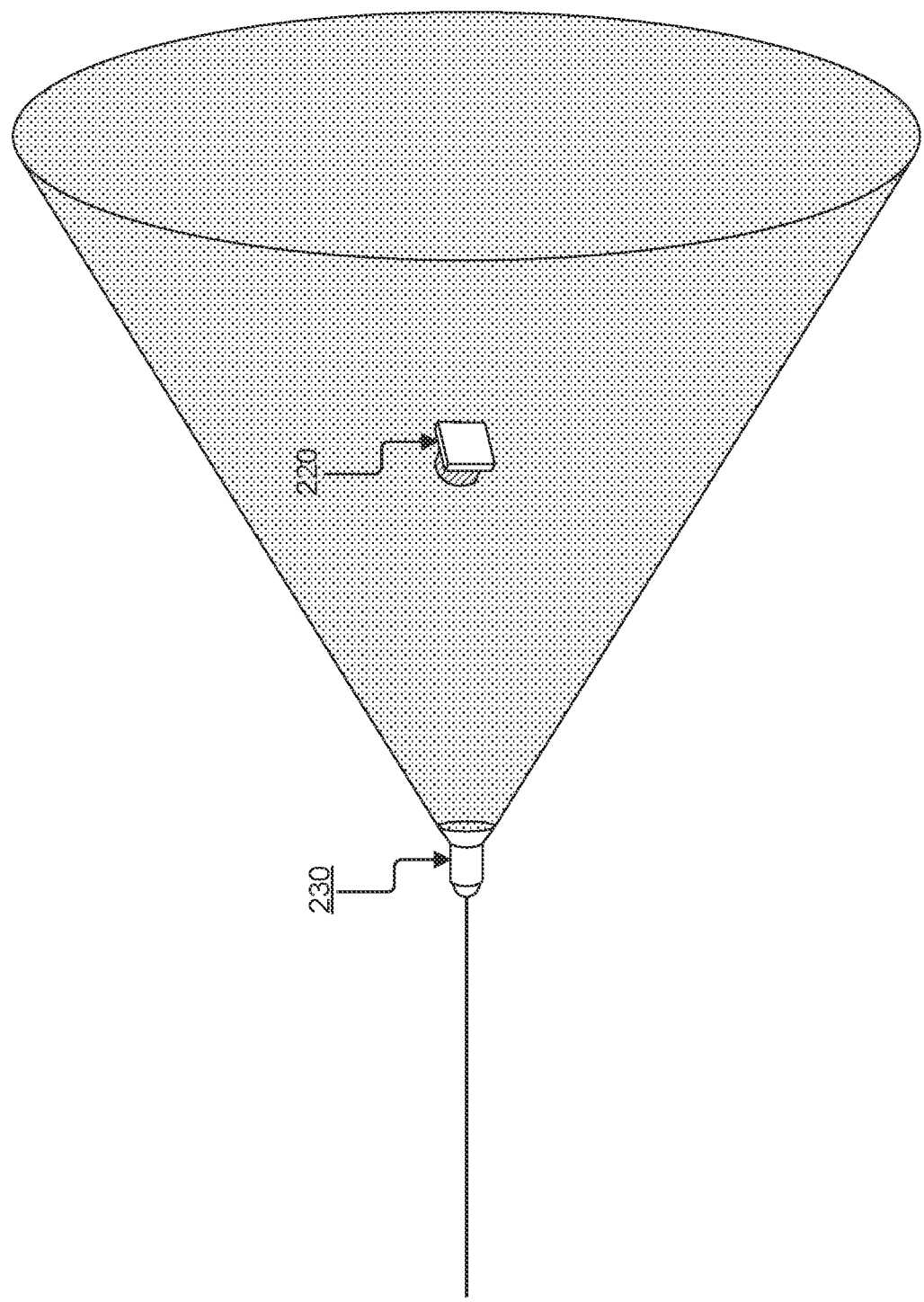
FIG. 2A illustrates an exemplary sensor and optical metric marker, according to some embodiments of the present disclosure.
Figure 2B:
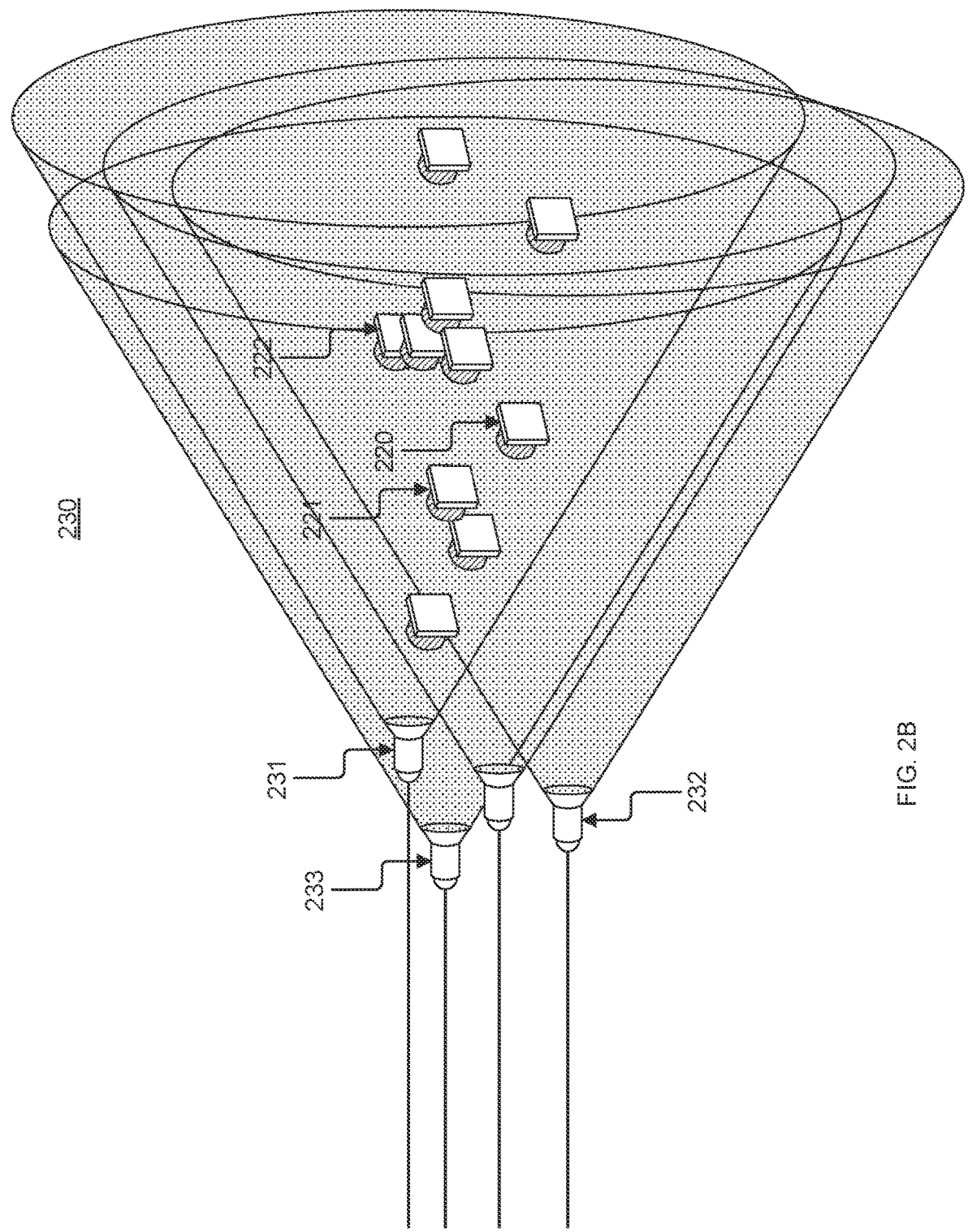
FIG. 2B illustrates a plurality of exemplary sensors and a plurality of optical metric markers, according to some embodiments of the present disclosure.

Referring now to FIGS. 2A-B, an exemplary sensor 230 and optical metric marker 220 is illustrated. In some embodiments, the sensor 230 may transmit optical signals to an optical metric marker 220. In some implementations, the sensors 230, 231, 232, 233 may implement one or more predetermined configurations.

For example, the quantity of sensors 230, 231, 232, 233 and the accuracy thereof may enrich measurement density and thereby reduce the post-estimation error. In some embodiments, the optical metrology system may require fewer sensors 231, 232, 233 when the sensors' 231, 232, 233 initial positions are known to a high degree of accuracy. In some implementations, the sensors 230, 231, 232, 233 may comprise a greater quantity of sensors 230, 231, 232, 233 when less is known about the configuration of the sensors 230, 231, 232, 233.

In some aspects, the increased quantity of lower resolution sensors 230, 231, 232, 233 may allow the optical metrology system to receive optical information with the same resolution as fewer, higher resolution sensors 231, 232, 233. In some embodiments, the number of sensors 230, 231, 232, 233 may exceed the required quantity for a determinate system. In some implementations, the estimator may use information received from an overdetermined system to reduce the noise from the readings received by the sensors 230, 231, 232, 233. In some aspects, this approach for noise reduction may improve the accuracy of the estimator.

In some aspects, the optical metrology system may comprise a plurality of metric markers 220 that may, due to quantity, enrich the measurement density. In some embodiments, the optical metrology system may calculate the positional information of the optical metric markers 220 and characterize the surface attached to the optical metric markers 220. In some implementations, the characterization of the surface may allow for active monitoring of the surface for deformation, comparing the surface to the intended shape and orientation for signal transmission, and evaluating intentional orientation adjustments for alignment, as non-limiting examples.

Figure 3A:
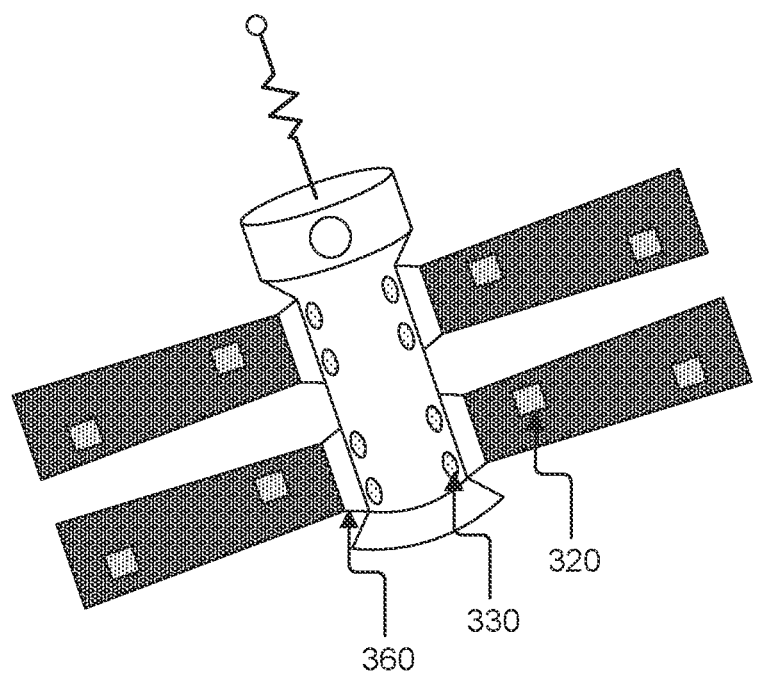
FIG. 3A illustrates an embodiment of an exemplary optical metrology system, according to some embodiments of the present disclosure.
Figure 3B:
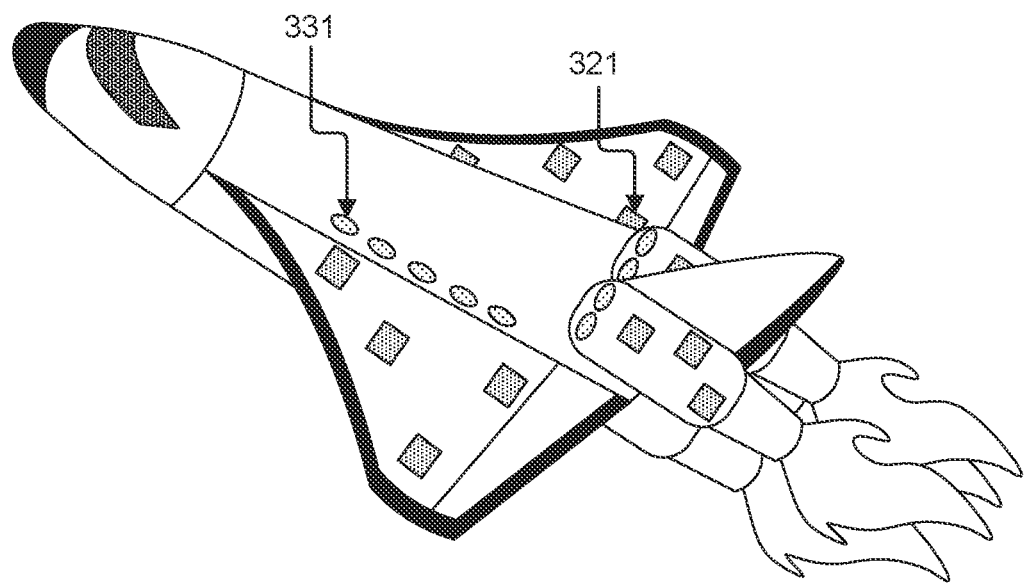
FIG. 3B illustrates an embodiment of an exemplary optical metrology system, according to some embodiments of the present disclosure.

Referring now to FIGS. 3A-B, an embodiment of an exemplary optical metrology system 300 is illustrated. In some implementations, the optical metrology system 300 may comprise a plurality of sensors 330. In some aspects, the sensors 330 may send optical signals to a plurality of optical metric markers 320. In some embodiments, the optical metrology system may comprise a plurality of controllers 360.

As an illustrative example, a satellite may comprise a plurality of transmission panels that transmit radio frequency signals. The sensors 330 may characterize the surfaces of the transmission panels from metric signals received from a plurality of optical metric markers 320. The estimator may use the linear distances and velocities to characterize the surface of the transmission panels. In some embodiments, the estimator may smooth the optical signal received from the optical metric markers 320.

After characterizing the surface of the transmission panels, the estimator may relay information to one or more actuation command system, which may actuate controllers 360 attached to the transmission panels. In some implementations, the estimator may relay information to a phase correction system, which may command the phase and intensity of signal emitted from individual RF elements, or groups of elements, to improve the integrity of the signal.

In some aspects, after the mechanical adjustments have been implemented on the transmission structure, the estimator may receive information from integrated RF sensors that measure the radio frequency signal and compare the performance to the intended transmission to evaluate and reduce error in the mechanical adjustment estimations.

As another example, a space shuttle may use sensors 331 to monitor the structural integrity of essential flight components during flight. The estimator may use data from separate sensors 331 to evaluate the deformations of the fuselage during lift off as well as monitor deformations of the wings of the spacecraft as the shuttle reenters the atmosphere from orbit. As the estimator detects large deformations in the wings, the estimator may direct an automated flight system to adjust the entry angle of the space shuttle to reduce the deformation to tolerable levels.

Figure 4A:
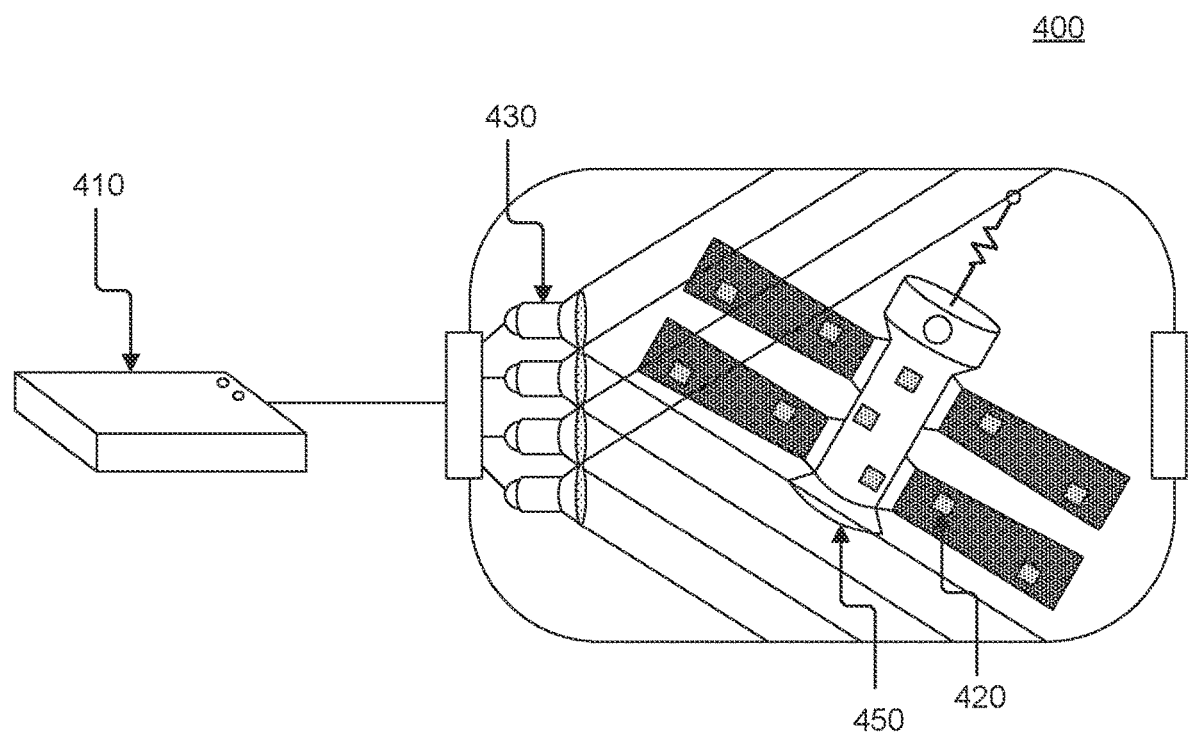
FIG. 4A illustrates an embodiment of an exemplary optical metrology system, according to some embodiments of the present disclosure.
Figure 4B:
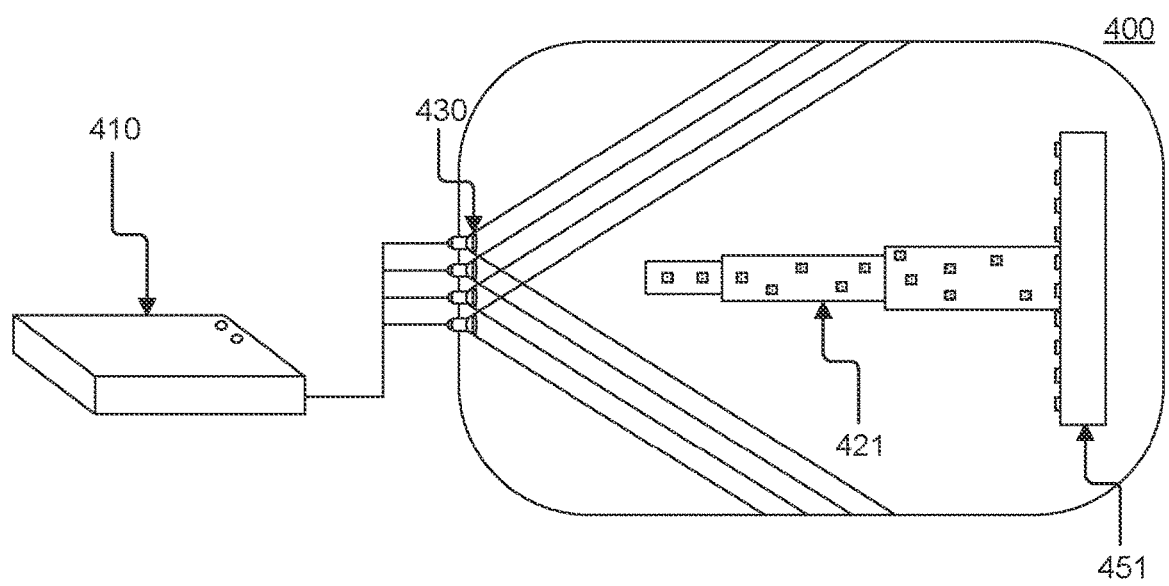
FIG. 4B illustrates an embodiment of an exemplary optical metrology system, according to some embodiments of the present disclosure.

Referring now to FIGS. 4A-B, an embodiment of an optical metrology system 400 is illustrated. In some embodiments, the optical metrology system 400 may comprise a transmission structure 450, 451. In some implementations, the transmission structure 450, 451 may comprise a plurality of optical metric markers 420, 421.

In some embodiments, the optical metric markers 420, 421 may characterize one or more surfaces of the transmission structure 450, 451 via a computation module 410. In some aspects, the transmission structure 450, 451 may be subjected to an external environment.

As an illustrative example, a satellite is placed in a vacuum chamber to evaluate the satellite's integrity and functional performance in a simulated space environment. The satellite may comprise a plurality of optical metric markers 420 that allow for deformation monitoring as the satellite is subjected to anticipated stressors within the vacuum chamber.

The vacuum chamber may comprise sensors 430 that characterize the surfaces of the satellite and can discern deformations within the characterized surfaces in real-time as the stresses are induced. In some embodiments, the measurements recorded by the sensors 430 may be received and interpreted by a computation module 410 that may characterize the surfaces of the satellite and calculate any deformation.

As another example, a large transmission antenna intended for the international space station may be placed in a vacuum chamber to evaluate anticipated performance within a simulated environment. Similar to the previous example, sensors 430 may use optical metric markers 421 to characterize the surfaces of the transmission antenna and measure deformation. This demonstrates that the same process may be utilized for large structure that may be components, in addition to independent structures.

Figure 5A:
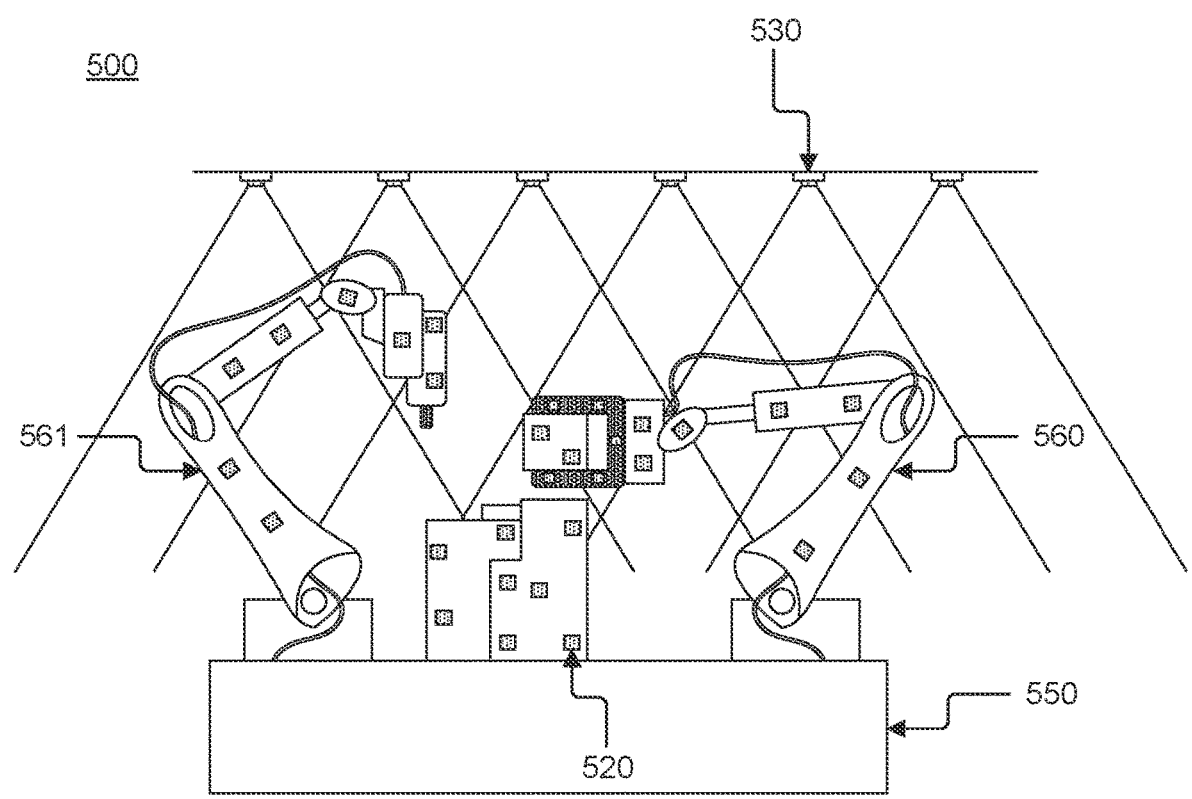
FIG. 5A illustrates an embodiment of an exemplary optical metrology system, according to some embodiments of the present disclosure.
Figure 5B:
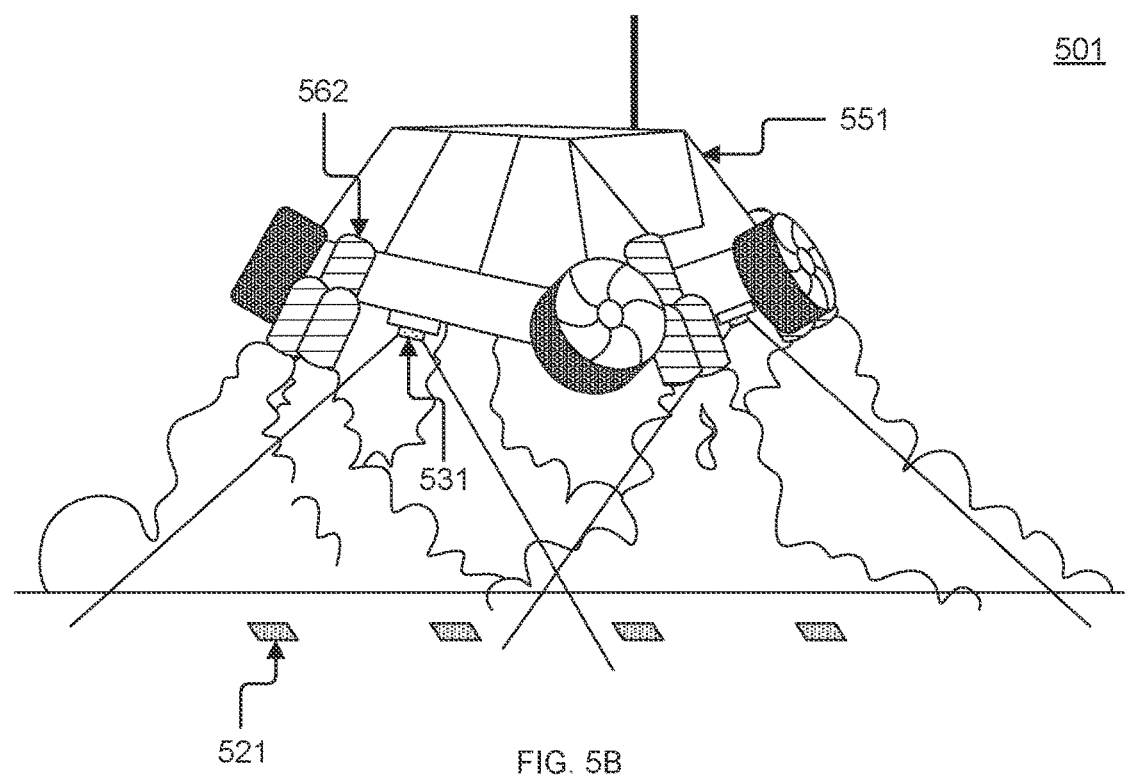
FIG. 5B illustrates an embodiment of an exemplary optical metrology system, according to some embodiments of the present disclosure.

Referring now to FIGS. 5A-B, an embodiment of an exemplary optical metrology system 500, 501 is illustrated. In some implementations, the optical metrology system 500, 501 may comprise a plurality of sensors 530, 531. In some aspects, the sensors 530, 531 may send optical signals to a plurality of optical metric markers 520, 521. In some embodiments, the optical metrology system may comprise a plurality of controllers 560, 561, 562. In some implementations, the controllers 560 may interface with a transmission structure 550, 551.

As an illustrative example, an assembly robot may assemble spacecraft while in orbit. The assembly robot and the spacecraft may comprise a plurality of optical metric markers that allow sensors 530 on a separate external device to inform the actuation necessary to assemble the spacecraft. The sensors 530 may receive linear metrics from a plurality of optical metric markers 520 simultaneously. The estimator may receive location about the same optical metric marker 520 from two or more sensors 530, via a multilateration algorithm, thereby allowing the optical metric marker 520 to be pinpointed in three-dimensional space. After understanding the three-dimensional location of the assembly robot, its controllers 560, 561 that assemble the spacecraft, and the spacecraft components, the estimator may inform adjustment of orientation and three-dimensional position to assemble the spacecraft.

As another example, the assembly process may exist in a terrestrial manufacturing facility, where the sensors 530 are installed above assembly lines, thereby facilitating automated assembly on a manufacturing line. In some implementations, components may be manufactured with the reflective markers that may function as optical metric markers 520 for assembly. In some aspects, the sensors 530 may exhibit a sensitivity to predetermined materials, surfaces, and other non-limiting indicators, that may function as optical metric markers 520. In some embodiments, application methods for the optical metric markers 520 may comprise installation, attachment, or paint, as non-limiting examples.

As another example, a rover may comprise at least one sensor 531 to assist in extraterrestrial navigation. The sensors 531 may detect optical metric markers 521 on the surface of a planet as the rover lands. These optical metric markers 521 may allow the optical metrology system to orient and rotate, as non-limiting motions, the lunar rover to land in the intended orientation. In some embodiments, the lunar rover may comprise a deployment mechanism to place optical metric markers on an intended landing surface as it completes its approach to the surface. In some implementations, the optical metric markers 521 may comprise reflective paint that is applied to an intended surface.

Figure 6:
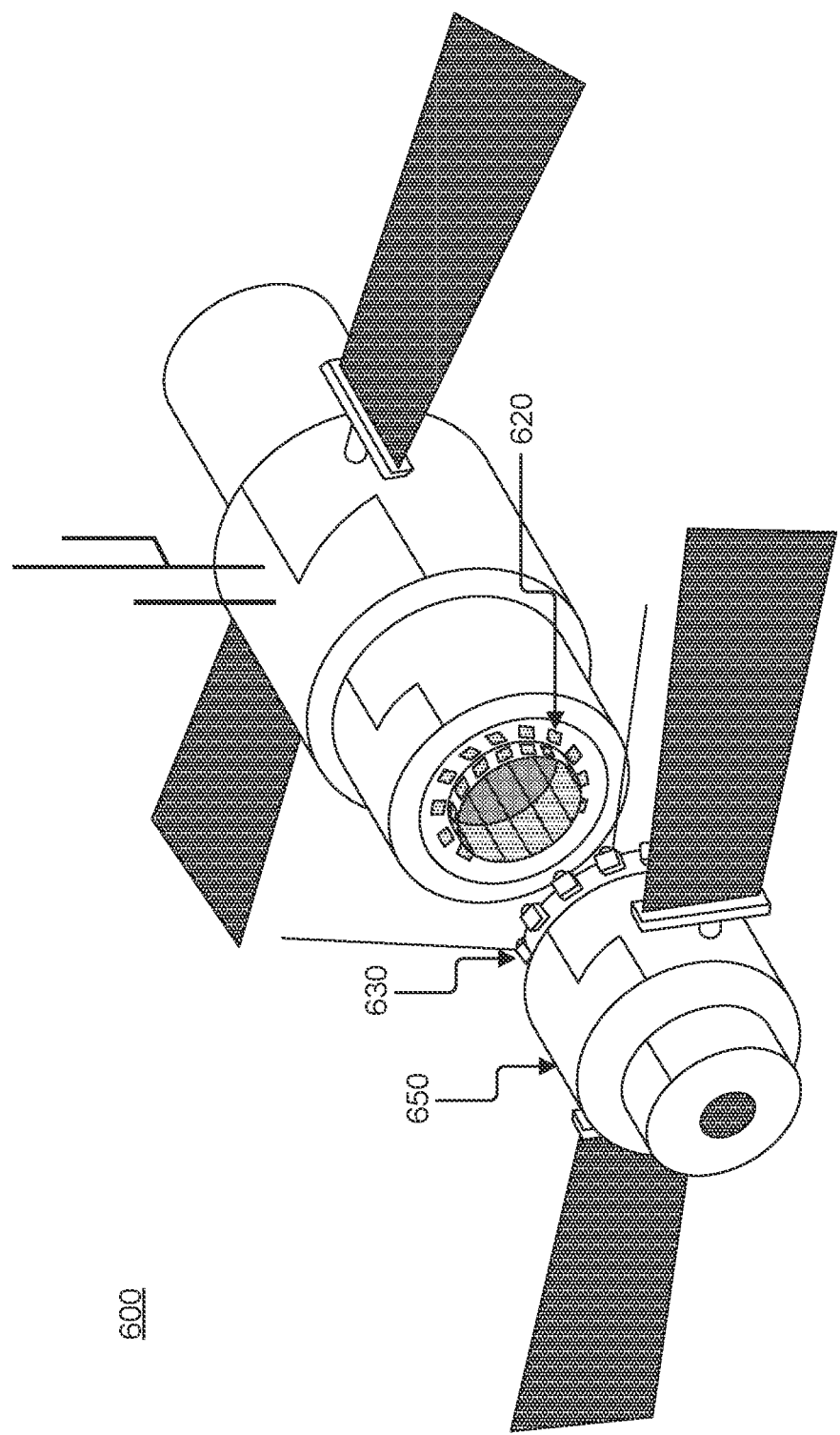
FIG. 6 illustrates an embodiment of an exemplary optical metrology system, according to some embodiments of the present disclosure.

Referring now to FIG. 6, an exemplary optical adjustment 600 system is illustrated. In some implementations, the optical metrology system 600 may comprise a plurality of sensors 630. In some aspects, the sensors 630 may send optical signals to a plurality of optical metric markers 620. In some embodiments, the optical metrology system 600 may comprise a transmission structure 650. In some implementations, the transmission structure 650 may compose half of the optical metrology system.

As an illustrative example, a spacecraft may comprise a plurality of sensors 630 that are aligned around a docking mechanism on the space craft. When the spacecraft nears a space station, the sensors 630 on the spacecraft may interface with optical metric markers 620 on the space station to ensure an intentional connection between the space shuttle and the space station during docking procedures.

Figure 7A:
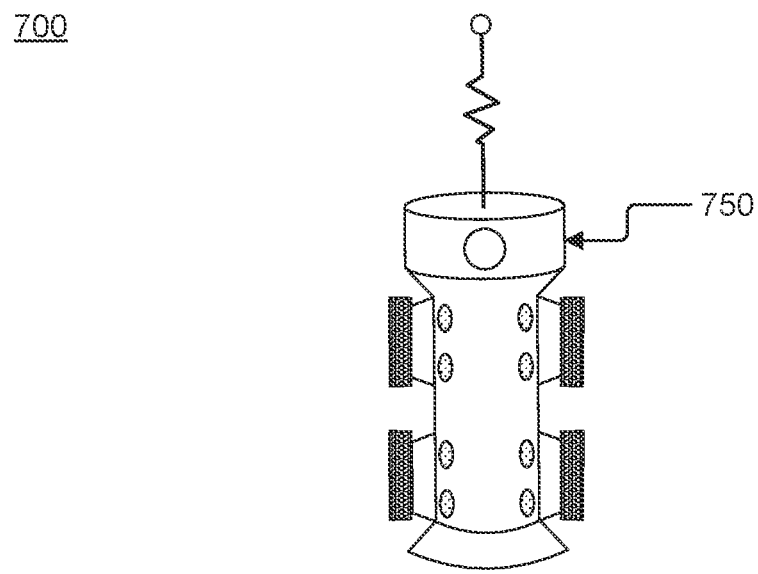
FIG. 7A illustrates an embodiment of an exemplary optical metrology system, according to some embodiments of the present disclosure.
Figure 7B:
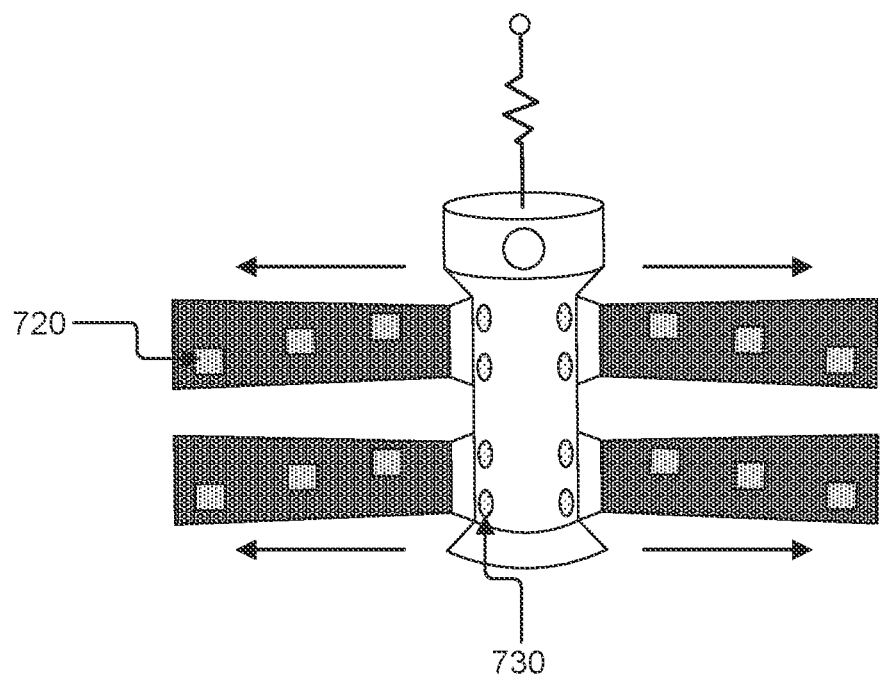
FIG. 7B illustrates an embodiment of an exemplary optical metrology system, according to some embodiments of the present disclosure.

Referring now to FIGS. 7A-B, an embodiment of an optical metrology system 700 is illustrated. In some embodiments, the optical metrology system 700 may comprise a transmission structure 750. In some implementations, the transmission structure 750 may comprise a plurality of optical metric markers 720. In some embodiments, the position and orientation of the optical metric markers 720 may be captured by a plurality of sensors 730.

In some implementations, the optical metrology system 700 may monitor actuated movement of the transmission structure 750. As an illustrative example, a satellite may enter orbit in a stowed state. After orbit is attained, the satellite may deploy transmission panels from its sides to begin functional operations. On the body of the satellite, sensors 730 may monitor the motion of retroreflective optical metric markers 720 on the transmission panels to ensure the transmission panels fully extend by the anticipated deployment method.

Figure 8:
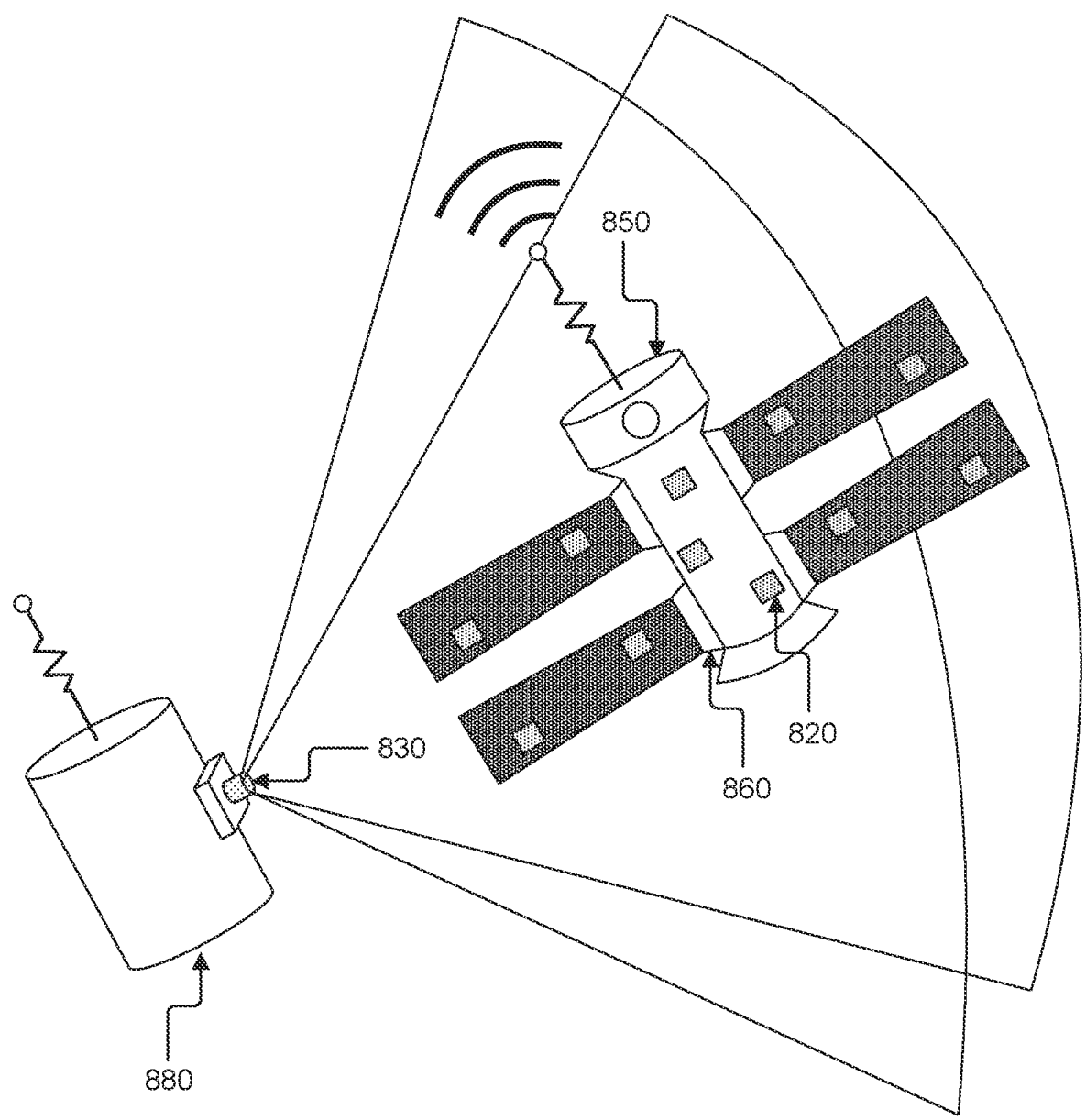
FIG. 8 illustrates an exemplary optical metrology system, according to some embodiments of the present disclosure.

Referring now to FIG. 8, an exemplary optical metrology system is illustrated. In some implementations, the optical metrology system 800 may comprise a plurality of sensors 830. In some aspects, the sensors 830 may send optical signals to a plurality of optical metric markers 820. In some embodiments, the optical metrology system 800 may comprise a plurality of controllers 860. In some implementations, the controllers 860 may interface with a transmission structure 850. In some implementations, the transmission structure 850 may interface with a sensing device 880.

In some aspects, the sensors 830 may reside on a separate device from the optical metric markers 820. For example, the sensing device 880 may comprise a plurality of sensors 830 that allow for structural evaluation of the entire transmission structure 850 simultaneously. In some embodiments, the sensing device 880 may be able to maneuver around one or more transmission structures 850 to detect deformation from all sides of the transmission structure 850. In some implementations, the sensing device 880 may use the sensors 830 to evaluate a plurality of transmission structures 850.

Figure 9:
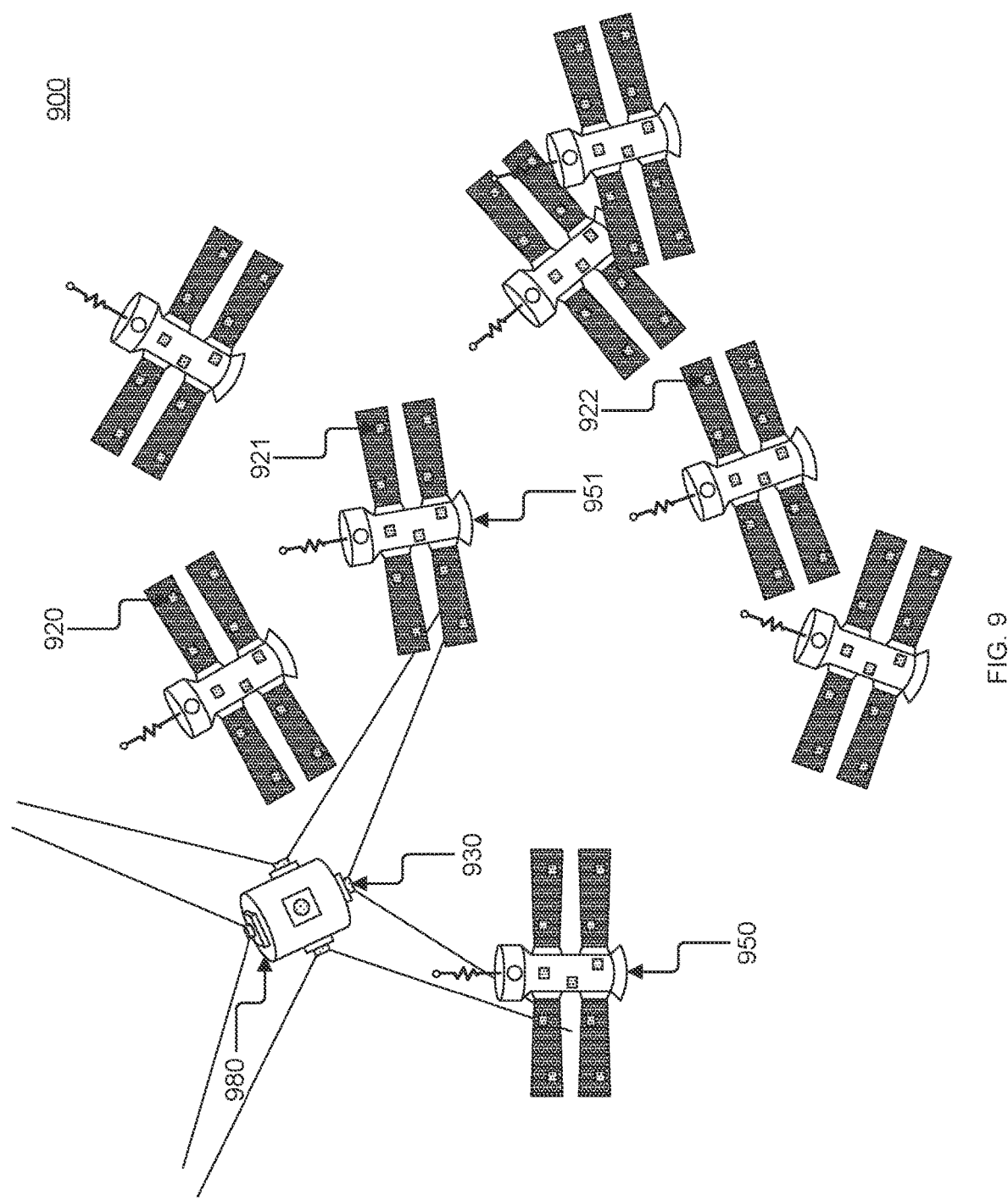
FIG. 9 illustrates an exemplary optical metrology system comprising a plurality of transmission structures, according to some embodiments of the present disclosure.

Referring now to FIG. 9, an exemplary optical metrology system 900 comprising a plurality of transmission structures is illustrated. In some implementations, the optical metrology system 900 may comprise a plurality of sensors 930. In some aspects, the sensors 930 may send optical signals to a plurality of optical metric markers 920, 921, 922. In some embodiments, the plurality of optical metric markers 920, 921, 922 may interface with a transmission structure 950, 951. In some implementations, the transmission structure 950, 951 may interface with a sensing device 980.

In some aspects, the sensors 930 may reside on a separate device from the optical metric markers 920, 921, 922. For example, the sensing device 980 may comprise a plurality of sensors 930 that allow for structural evaluation of the entire transmission structure 950 simultaneously. Separate sensors 930 may allow the sensing device to evaluate structural integrity as a whole, compared to a component of the transmission structure 950.

Figure 10A:
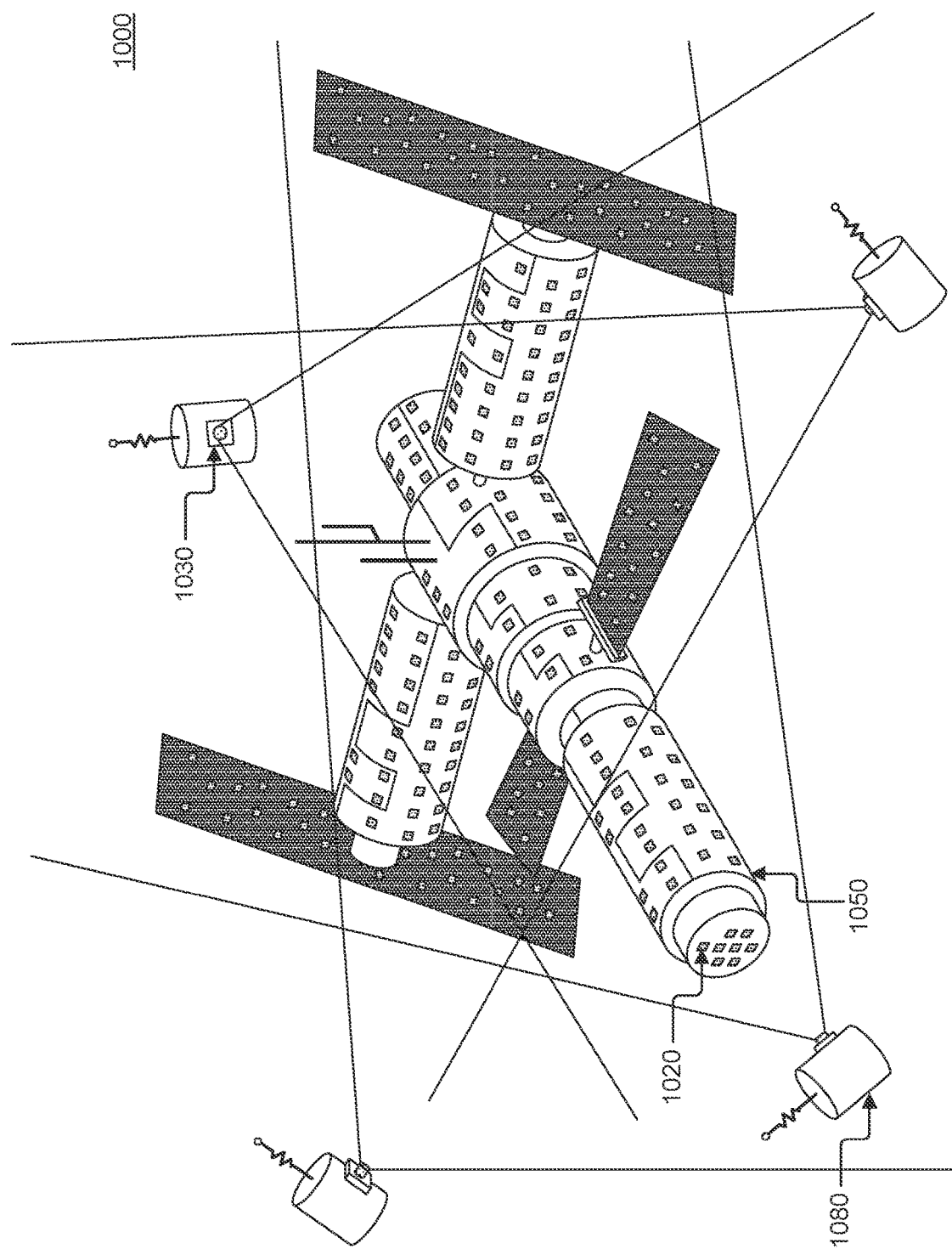
FIG. 10A illustrates an exemplary optical metrology system comprising a plurality of sensors, according to some embodiments of the present disclosure.

Referring now to FIGS. 10A-B, an optical metrology system 1000 comprising a plurality of sensors 1030, 1031 is illustrated. In some embodiments, the optical metrology system 1000 may comprise a transmission structure 1050, 1051. In some implementations, the transmission structure 1050, 1051 may comprise a plurality of optical metric markers 1020, 1021. In some aspects, the optical metric markers 1020, 1021 may relay metric information via their reflectivity to a plurality of sensors 1030, 1031. In some embodiments, the transmission structure 1050, 1051 may exceed the optical range of the sensors 1030, 1031, or an obstruction may prevent the full view of the optical metric markers 1020, 1021 by the sensors, or both. In some implementations, optical metrology system 1000 may receive metric information from other sensors 1032 that may have sufficient visibility of the obstructed optical metric markers 1020, 1021.

In some aspects, the computation module may be able to formulate three-dimensional coordinates for distal optical metric markers 1020, 1021 by first mapping the location of the distant sensors 1030, 1031 relative to the first sensor 1030, 1031, and then using distal optical metric marker 1020, 1021 information received from the distant sensors 1030, 1031.

In some embodiments, the size of the transmission structure 1050 may exceed the range of the sensors 1030. In some aspects, the optical metrology system may require one or more external sensing devices 1080. In some implementations, the sensing devices 1080 may comprise a sensor 1030. In some aspects, the sensing devices 1080 may remain in visibility of each other to ensure the position of optical metric markers 1020 seen by all sensing devices 1080 may be aggregated to characterize the entirety of the intended surface of the transmission structure 1050.

In some embodiments, an obstruction may prevent the full view of the optical metric markers 1021 by the sensors 1031. As an example, a transmission structure 1051 affixed to a portion of a space station may have embedded sensors 1031 that cannot see all optical metric markers 1021 on the transmission structure 1051 because of a structural obstruction caused by the space station.

Additional sensors 1032 may remain in the range of the original sensors 1031 and capture the metric information from the previously obstructed optical metric markers 1021. The computation module may then be able to formulate three-dimensional coordinates for the distal to optical metric markers 1021 by first mapping the location of the distant sensors 1032 relative to the first sensor 1030, 1031, and then using distal optical metric marker 1021 information received from the distant sensors 1032.

Figure 11:
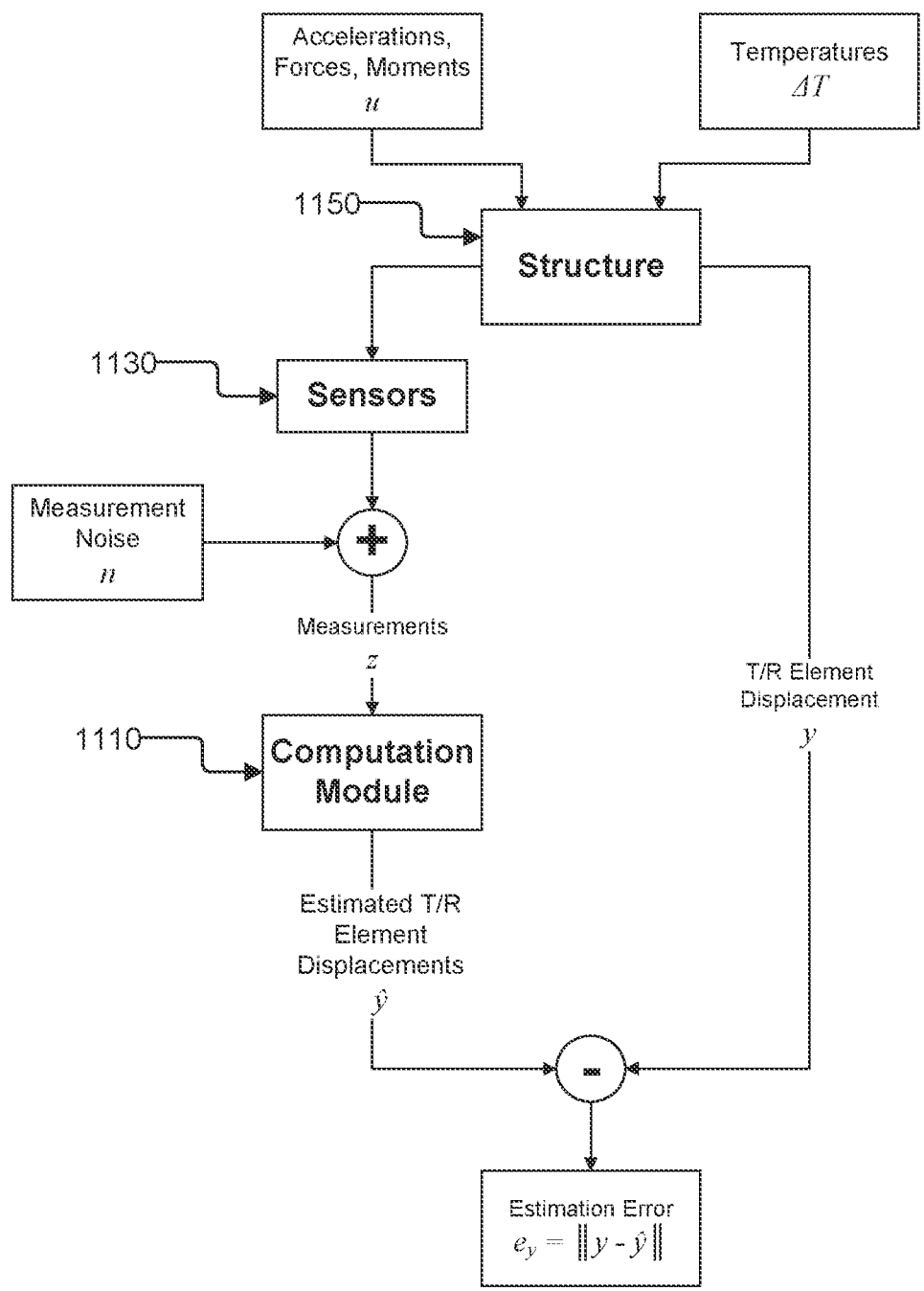
FIG. 11 illustrates an exemplary process for an optical metrology system, according to some embodiments of the present disclosure.

Referring now to FIG. 11, an exemplary process 1100 for an optical metrology system is illustrated. In some embodiments, the transmission structure 1150 may receive external forces from the surrounding environment. For example, the transmission structure's 1150 shape may be affected by the transmission structure's 1150 exposure to heat, or the lack thereof. As another example, the transmission structure 1150 may be subject to deformations due to acceleration, outside forces, and moments as the transmission structure 1150 moves in open space. In some implementations, the deflection or deformations may be measured by sensors 1130.

In some aspects, the sensors 1130 may collect information about the transmission structure's 1150 position and speed, as non-limiting examples. In some embodiments, the sensors 1130 may interface with optical metric markers that are secured along one or more surfaces of the transmission structure 1150. In some embodiments, the sensors 1130 may measure distance along a line of sight to at least one reflective optical metric marker. In some implementations, multiple sensors may simultaneously measure the distance to an array of optical metric markers. In some aspects, the estimator may be preceded by a multilateration or trilateration algorithm to determine the three-dimensional position of multiple optical metric markers (and sensors 1130) with respect to a selected spatial coordinate frame.

In some embodiments, the optical metrology system may calculate the positional information of the optical metric markers and characterize the shape of the surface attached to the optical metric markers. In some implementations, the characterization of the surface may allow for active monitoring of the surface for deformation, and from deformations, calculating external forces such as moments and applied point forces. In some aspects, information received from the sensors 1130 may allow the optical metrology system to compare the surface to the intended shape and orientation for signal transmission, as a non-limiting example. In some implementations, the characterization of the surface may allow the optical metrology system to modify the characterized surface.

In some embodiments, the information received from the sensors 1130 may be transmitted to a computation module 1110. In some implementations, the computation module 1110 may determine the quantities of interest (the displacements at predetermined locations on the transmission structure 1150) given the measurements. The characterization of the surface from these measurements may drive requirements on sensor 1130 resolution to ensure the post-estimator error meets predetermined threshold requirements. In some aspects, the configuration of the optical metrology system, the geometry, the placement of the sensors 1130, and the mechanics of the transmission 1150 structure, as non-limiting examples, may influence this error.

As an illustrative example, a transmission structure 1150 may be subjected to external forces. Two distance sensors may have been mounted at the root of the truss, measuring the two distances to an optical metric marker 1120. The truss undergoes deformation due to an unknown load and, as a result, the position of the optical metric marker 1120 undergoes a correlated deflection.

The computation module 1110 may compute the deformation resulting from the unknown load. The single-measurement error requirement may scale with the aspect ratio of the structure to meet a pre-defined post-estimation error.

In some embodiments, the computation module 1110 may, using information received from the sensors 1130, calculate errors in the estimations applied to the transmission structure 1150. In some aspects, the errors in the applied estimations may be calculated via an independent measurement, such as RF beam shape characterization from transmission and relay measurement system, as a non-limiting example. In some implementations, the computation module 1110 may adjust the computations and approximated factors accordingly to reduce the error in future estimations. In some aspects, the estimator 1110 may adjust estimate calculations based on the hardware available within the optical metrology system 1100.

Figure 12:
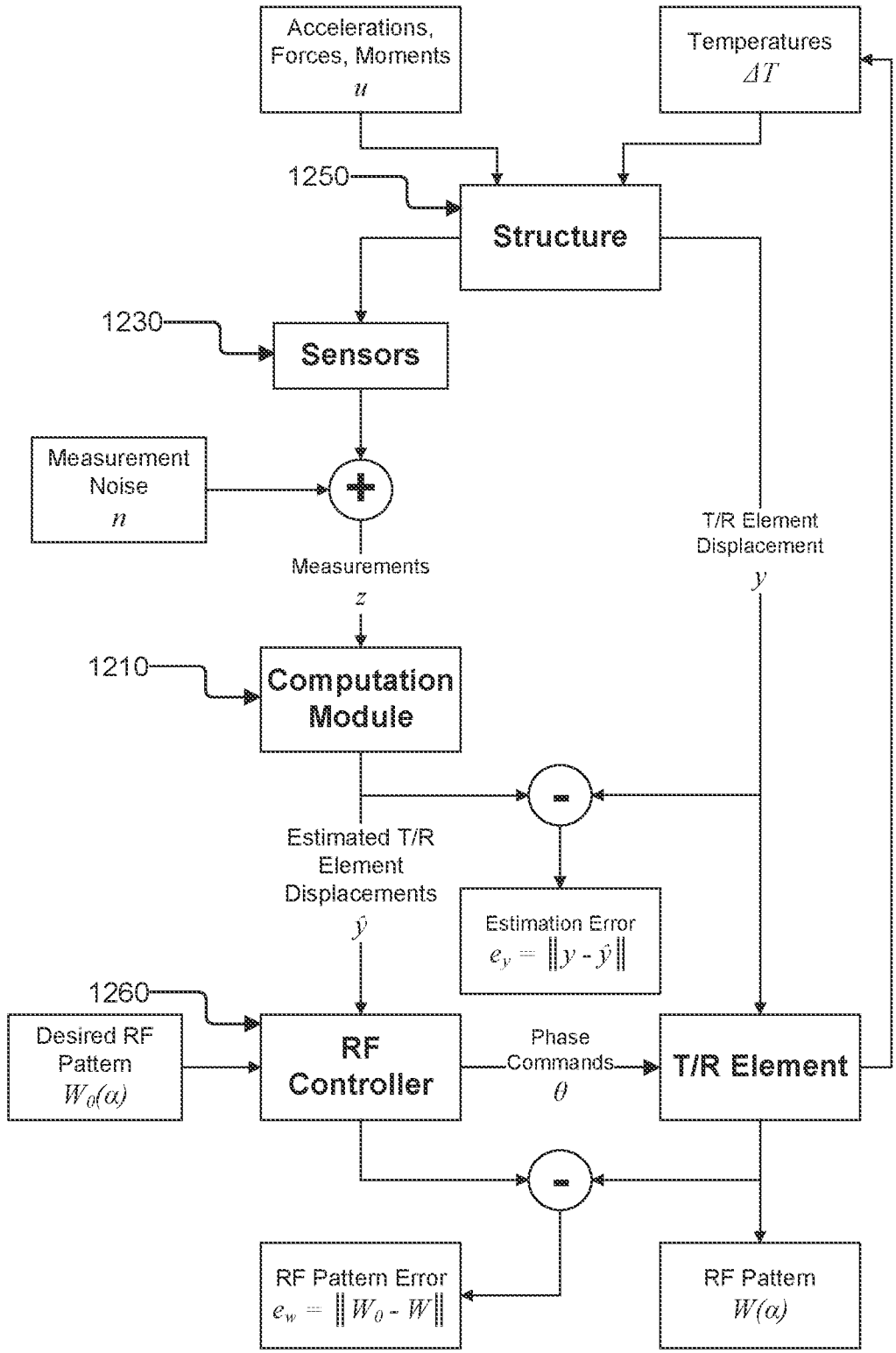
FIG. 12 illustrates an exemplary process for an optical metrology system with control elements, according to some embodiments of the present disclosure.

Referring now to FIG. 12, an exemplary process 1200 for an optical metrology system is illustrated. In some embodiments, the method described in FIG. 11 may be augmented by the ability to apply estimations to the adjustment of components of the transmission structure 1250.

In some implementations, information computed by the computation module 1210 may be applied to the actuation of mechanical components of the transmission structure 1250. As an illustrative example, the estimator may provide location-based adjustments that are received by one or more controllers 1260. The controllers may interface with the transmission structure 1250 and one or more extended radio frequency transmission panels. Using the sensors 1230 as confirmation of the intended actuation, the controllers 1260 may adjust the orientation of the transmission panels to adjust the transmission of the radio frequency signals.

After the adjustments are implemented, the computation module 1210 may evaluate the error in the estimation provided about the transmission structure 1250. In some aspects, error may be quantified by measuring the gain and beam shape in the radio frequency transmission emitted from the transmission panels. In some embodiments, the phase and power of the radio frequency transmitter may adjust to further refine the radio frequency signal, as directed by the RF controller 1260.

Figure 13:
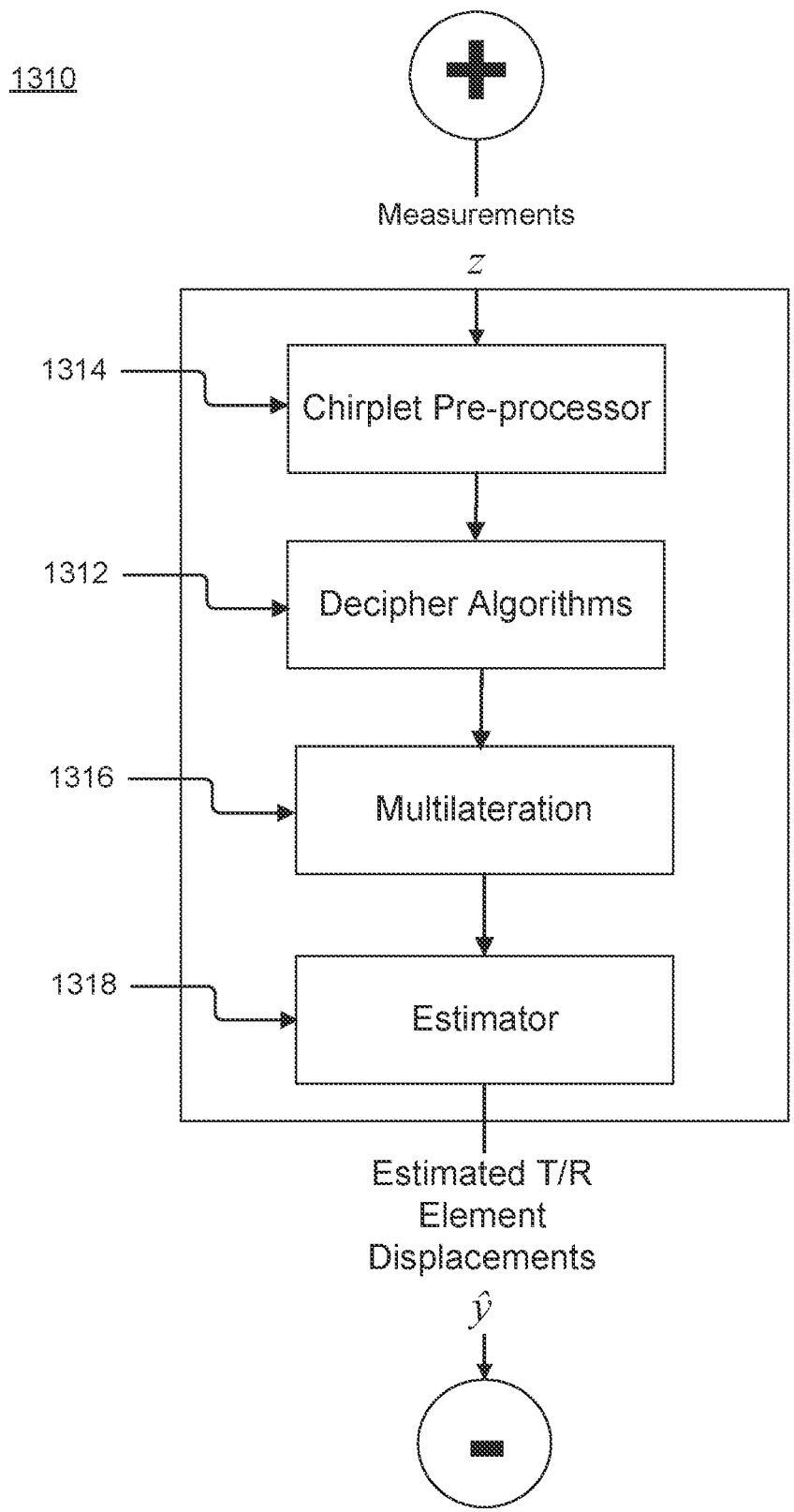
FIG. 13 illustrates an exemplary process for an optical metrology system, according to some embodiments of the present disclosure.

Referring now to FIG. 13, an exemplary process for a computation module 1310 is illustrated. In some implementations, the computation module 1310 may comprise a chirplet pre-processor 1314. In some aspects, the chirplet pre-processor 1314 may receive either raw OFDR time data or raw OFDR frequency data, which may comprise a Fourier transform of the time data. In some embodiments, the chirplet pre-processor 1314 may produce a range rate and a corrected range.

In some embodiments, the computation module 1310 may comprise a decipherer 1312. In some implementations, the decipherer may associate each range or distance received with a specific optical metric marker and corresponding sensor. In some aspects, the decipherer 1312 may be utilized for initial test cases: a limited number of targets that may comprise a limit on minimum target spacing. In some embodiments, the decipherer 1312 may receive range and intensity data from the sensors and output sets of ranges associated with sensors and optical metric markers.

For example, when using light as a method of measurement, the decipherer 1312 may determine which sensor emitted and received the measured light and which retroreflective optical metric marker returned the light to the sensor.

In some implementations, received time data may be subject to a Gaussian window, as a non-limiting example. In some embodiments, received frequency data may be subject to a Gaussian filter, as a non-limiting example. In some implementations, the chirplet pre-processor 1314 may identify peaks in the magnitude of the frequency data. In some aspects, each peak in the magnitude of the frequency data may be subject to a one or more analytical methods.

In some embodiments, the frequency samples corresponding to points within half logarithmic values near the frequency peak magnitudes may be selected. In some implementations, the frequency samples may be fit to a parabolic function to determine the magnitude of velocity (from the curvature of the parabolic function). In some aspects, the frequency samples may be divided by half and each half may be fit to a linear function. In some embodiments, the fit to a linear function may determine the sign of the velocity from the sign of the linear function curve fits.

In some implementations, the range rate (velocity) may be determined as the product of the sign of the velocity and the speed. In some aspects, the range rate and the frequency of the peak of the parabolic function curve fit may determine the range. In some implementations, the chirplet pre-processor may allow the optical metrology system to function accurately despite structural vibrations. In some embodiments, the chirplet pre-processor may transmit the range rate and the range for each optical metric marker to the deciphering module 1312.

In some aspects, the computation module 1310 may comprise a multilateration module 1316. In some implementations, the multilateration module 1316 may receive range and range rate sets with the sensor and optical metric marker metadata from the decipherer 1312 and output (x,y,z) coordinates of correlated sensors and optical metric markers. In some aspects, the multilateration module may produce cartesian velocities of the optical metric markers.

In some embodiments, the computation module 1310 may complete reference target separation in the spatial domain, or in the temporal domain, or both for on-orbit calibration and additional multilateration bounding. In some implementations, this design may use invariants in the system to provide additional bounding constraints on the estimator 1318 to reduce errors. For example, pre-determined and mechanically stable relative optical metric marker positions from a single measurement, and across multiple measurements across time, may provide known and physically meaningful constraints to the estimator 1318 solution space.

In some embodiments, the computation module 1310 may comprise an estimator 1318. In some implementations, the Estimator may receive coordinates and velocities of optical metric markers and transmit positions and angles of RF elements. In some aspects, the estimator may transmit positions and angles of other objects of interest that are marked with optical metric markers. In some embodiments, the positions and angles of RF elements may be transmitted to the controllers, which may actuate the RF transmitters, or otherwise correct the transmitting RF beam by adjusting the phase and power at various elements, as non-limiting examples.

Referring now to FIG. 14, an exemplary method 1400 for an optical metrology system is illustrated. At 1405, the transmission structure may receive external forces from the surrounding environment that affect the shape of the transmission structure. For example, the transmission structure may experience thermal deformations. As another example, the transmission structure may be subject to acceleration, outside forces, torsional forces, and moments as the transmission structure moves in open space.

In some aspects, the sensors may comprise a plurality of subcomponents that may allow the sensors to collect information about the transmission structure's speed, temperature, and acceleration, as non-limiting examples. In some embodiments, the sensors may interface with optical metric markers that are secured along one or more surfaces of the transmission structure.

At 1410, the sensors may measure distance along a line of sight to at least one reflective optical metric marker. In some implementations, multiple sensors may simultaneously measure the distance to an array of optical metric markers. In some embodiments, a sensor may measure distances to a plurality of common optical metric markers simultaneously. At 1415, a multilateration or trilateration algorithm may determine the three-dimensional position of multiple optical metric markers (and sensors) with respect to a selected spatial coordinate frame.

At 1420, the optical metrology system may use the positional information of the optical metric markers to characterize the shape of the surface attached to the optical metric markers. In some implementations, the characterization of the surface may enable calculation of external forces such as moments and applied point forces. At 1425, information received from the sensors may allow the optical metrology system to compare the surface to the intended shape and orientation for signal transmission, as a non-limiting example. At 1430, the characterization of the surface may allow the optical metrology system to modify the shape and aperture of the characterized surface.

In some embodiments, the information generated by the multilateration or trilateration algorithm may be transmitted to an estimator. In some implementations, the estimator may determine displacements at predetermined locations on the transmission structure given the measurements. In some embodiments, the characterization of the surface from these measurements may place additional requirements on sensor resolution to ensure the post-estimator error meets predetermined threshold requirements. In some aspects, the configuration of the optical metrology system, the geometry, the placement of the sensors, and the mechanics of the transmission structure, as non-limiting examples, may influence this error.

At 1435, the estimator may, using information received from the sensors, calculate errors in the estimations applied to the transmission structure. In some aspects, the errors in the applied estimations may be calculated via an independent measurement, such as RF beam shape characterization from a transmission and relay measurement system, as a non-limiting example. At 1440, the estimator may adjust the computations and approximated factors accordingly to reduce the error in future estimations. In some embodiments, the optical metrology system may apply additional mechanical adjustments to the transmission structure to further improve the transmission of the radio frequency signal.

Figure 15:
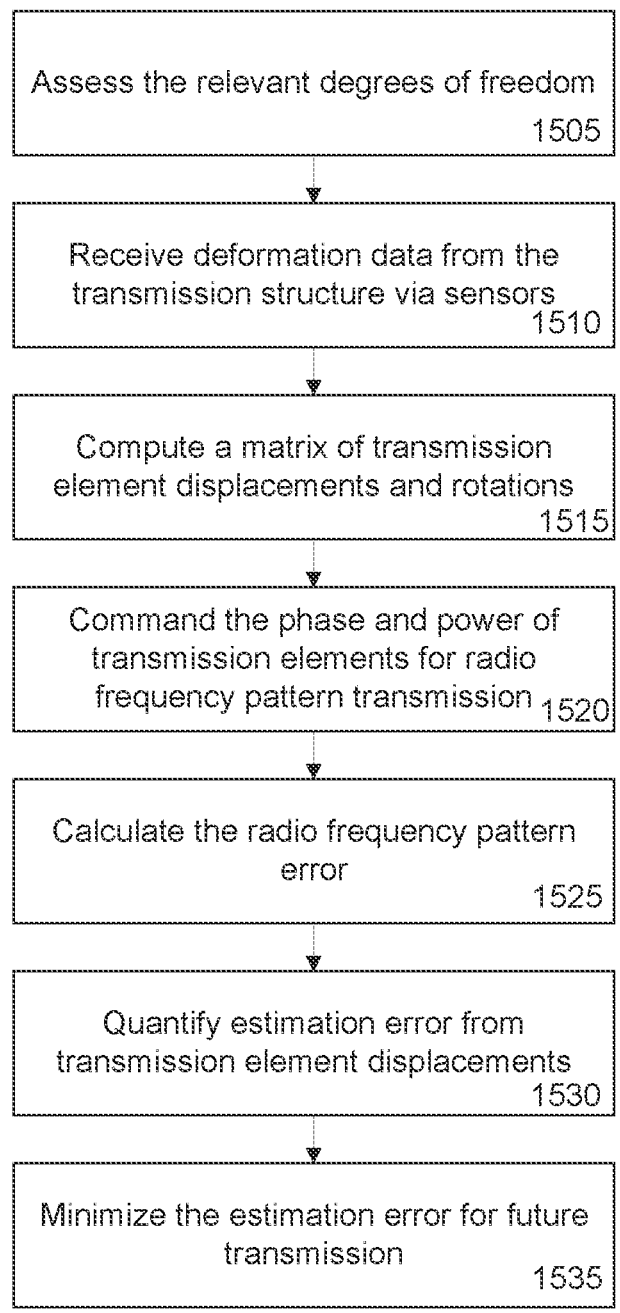
FIG. 15 illustrates an exemplary estimator method, according to some embodiments of the present disclosure.

Referring now to FIG. 15, an exemplary method 1500 for an estimator is illustrated. At 1505, the estimator may provide knowledge of six degrees of freedom of each radio frequency element (or the component of interest for non-radio frequency applications) based on three degrees-of-freedom positional or velocity knowledge of optical metric markers. In some implementations, the estimator may be built on prior knowledge of a transmission structure's stiffness matrix and mode shapes. In some aspects, the estimator may assume the structure is engineered with well-predicted behavior.

In some embodiments, temperatures and forces may operate as forcing functions upon the physical structure, which result in a quasi-static or dynamically changing shape. In some implementations, the shape of the structure may result in both the displacements of optical metric markers and the displacements and rotations of transmitting elements. At 1510, sensors may measure ranges to the optical metric markers, with some noise introduced from a plurality of sources. At 1515, the estimator may receive the measurement ranges and output a matrix of transmission element displacements and rotations.

At 1520, the radio frequency controller may utilize the computed matrix of element displacements and rotations to command the phase and power of the transmission elements to emulate the desired radio frequency pattern. In some embodiments, the resulting radio frequency pattern may be transmitted. At 1525, the radio frequency pattern error may comprise the absolute value of the difference between the desired radio frequency pattern and the transmitted radio frequency pattern.

At 1530, the estimation error may comprise the absolute value of the difference between the actual displacements, velocities, and rotations of the transmission elements and the computed matrix of element displacements, velocities, and rotations. In some implementations, a radio frequency controller may receive the computed matrix of element displacements, velocities, and rotations without knowledge of the estimation error. At 1535, the estimator may be designed to minimize the estimation error over the range of expected orbital conditions and operations, as non-limiting examples.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A method for optical metrology comprising:
   receiving an external data reading exerted on a transmission structure, wherein the transmission structure comprises one or more surfaces;
   measuring distance from one or more sensors to a plurality of optical metric markers;
   calculating a plurality of three-dimensional positions of the plurality of optical metric markers based on the external data and the distance from one or more sensors to the plurality of optical metric markers;
   characterizing at least one of the one or more surfaces attached to the plurality of optical metric markers;
   comparing current surface orientation of the transmission structure to a predefined target orientation;
   assessing current transmission for post-estimator error;
   revising current estimations based on post-estimator error;
   implementing mechanical adjustment of the transmission structure.

2. The method of claim 1, further comprising transmitting a set of positional information to an estimator, wherein the estimator receives the set of positional information and outputs a matrix of transmission element displacements and rotations.

3. The method of claim 2, wherein a radio frequency controller utilizes the matrix of element displacements and rotations to command a phase and power to emulate a desired radio frequency pattern.

4. The method of claim 1, wherein the transmission structure comprises a space object.

5. The method of claim 2, wherein the space object comprises a satellite.

6. The method of claim 1, further comprising receiving external forces from the surrounding environment that affect the shape of the transmission structure.

7. The method of claim 6, wherein the external forces cause thermal deformations.

8. The method of claim 6, wherein the transmission structure moves in open space based on one or more acceleration, external forces, and torsional forces.

9. The method of claim 1, wherein calculating a plurality of three-dimensional positions of the plurality of optical metric markers utilizes a multilateration algorithm.

10. The method of claim 9, further comprising transmitting information generated by the multilateration algorithm to an estimator.

11. The method of claim 10, further comprising determining displacements at predetermined locations on the transmission structure given transmitted information received by the estimator.

12. The method of claim 11, wherein characterization of the surface from transmitted information place additional requirements on sensor resolution to ensure a post-estimator error meets predetermined threshold requirements.

13. The method of claim 1, further comprising modifying surface shape and aperture for optimal radio frequency transmission.

14. A method for optical metrology comprising:
    receiving deformation data from a plurality of sensors located on a transmission structure;
    computing a matrix of transmission element displacements and rotations utilizing a multilateration algorithm;
    commanding a phase and power of the transmission element displacements and rotations for radio frequency pattern transmission;
    calculating a radio frequency pattern error based on received radio frequency pattern transmissions;
    quantifying an estimation error from the transmission element displacements and rotations;
    minimizing the estimation error for future transmission.

15. The method of claim 14, wherein the transmission structure comprises a space object.

16. The method of claim 15, wherein the space object freely moves in space.

17. The method of claim 14, further comprising collecting information about the transmission structure based on information received from a plurality of subcomponents located on or in logical communication with the transmission structure.

18. The method of claim 14, wherein one or more sensors are communicatively coupled with a plurality of metric markers located on one or more surfaces of the transmission structure.

19. The method of claim 14, wherein one or both quantifying and minimizing the estimation error occurs through an estimator.

20. The method of claim 19, wherein the estimator provides knowledge of degrees of freedom for one or more radio frequency elements.

* * * * *